US011745357B2

(12) United States Patent
Demura et al.

(10) Patent No.: US 11,745,357 B2
(45) Date of Patent: Sep. 5, 2023

(54) ROBOTIC ARM AND ROBOT HAVING THE SAME

(71) Applicant: KAWASAKI JUKOGYO KABUSHIKI KAISHA, Kobe (JP)

(72) Inventors: Nobuhiro Demura, Akashi (JP); Masato Yoneyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 314 days.

(21) Appl. No.: 17/059,541

(22) PCT Filed: May 30, 2019

(86) PCT No.: PCT/JP2019/021561
§ 371 (c)(1),
(2) Date: Nov. 30, 2020

(87) PCT Pub. No.: WO2019/230896
PCT Pub. Date: Dec. 5, 2019

(65) Prior Publication Data
US 2021/0206000 A1 Jul. 8, 2021

(30) Foreign Application Priority Data

May 31, 2018 (JP) .................................. 2018-104976

(51) Int. Cl.
*B25J 11/00* (2006.01)
*B25J 19/00* (2006.01)
*B25J 15/00* (2006.01)

(52) U.S. Cl.
CPC ....... *B25J 11/0075* (2013.01); *B25J 15/0019* (2013.01); *B25J 19/0025* (2013.01); *B25J 19/0075* (2013.01)

(58) Field of Classification Search
USPC .................................................. 118/323, 321
See application file for complete search history.

(56) References Cited

U.S. PATENT DOCUMENTS

2005/0194474 A1* 9/2005 Sakakibara ......... B05B 13/0431
239/690
2006/0104792 A1 5/2006 Giuliano
(Continued)

FOREIGN PATENT DOCUMENTS

JP 2000-158377 A 6/2000
JP 2005-279635 A 10/2005
(Continued)

*Primary Examiner* — Yewebdar T Tadesse
(74) *Attorney, Agent, or Firm* — Oliff PLC

(57) ABSTRACT

A robotic arm capable of reducing the size while suppressing damage to a plurality of elongated members inserted therein, is provided. The robotic arm to which an end effector is attached, includes plurality of elongated members extending to end effector, cylindrical housing defining a periphery of internal space configured to be a passage of plurality of elongated members, and an attaching structure provided to a tip end of the internal space of the cylindrical housing so as to attach the end effector to a tip-end part of the cylindrical housing. The attaching structure includes insertion holes formed corresponding to plurality of elongated members so as to insert the plurality of elongated members therein, and fixing members configured to fix the plurality of elongated members to the insertion holes, respectively. The cylindrical housing is formed so that the inner diameter is larger at the tip-end part than at a base-end part.

6 Claims, 3 Drawing Sheets

(56) References Cited

U.S. PATENT DOCUMENTS

| | | | |
|---|---|---|---|
| 2006/0243087 A1 | 11/2006 | Krogedal | |
| 2014/0013893 A1* | 1/2014 | Asano | B25J 18/00 901/27 |
| 2015/0013491 A1 | 1/2015 | Mori | |

FOREIGN PATENT DOCUMENTS

| | | |
|---|---|---|
| JP | 2007-521144 A | 8/2007 |
| JP | 2015-016523 A | 1/2015 |

* cited by examiner

ROBOTIC ARM AND ROBOT HAVING THE SAME

TECHNICAL FIELD

The present disclosure relates to a robotic arm and a robot having the robotic arm.

BACKGROUND ART

Conventionally, robotic arms to which an end effector is attached are known. One example of such robotic arms is an industrial robot disclosed in Patent Document 1.

Patent Document 1 discloses a robotic arm to which a working tool, such as a gripper or a welding torch, is attached at a tip end of a wrist of the robotic arm. The wrist mainly includes a wrist machine frame, and a wrist inner frame attached to the wrist machine frame so as to be rotatable about an axis J5. The wrist inner frame is provided with a working tool attaching part which is rotary driven around an axis J6 together with the working tool.

REFERENCE DOCUMENT OF CONVENTIONAL ART

Patent Document

[Patent Document 1] JP2015-016523A

DESCRIPTION OF THE DISCLOSURE

Problem to be Solved by the Disclosure

The conventional robotic arm, like the one disclosed in Patent Document 1, is desired to be reduced in size considering an installation space at a work site. Generally, the conventional robotic arm is provided with a cylindrical housing defining a periphery of an internal space which is a passage for a plurality of elongated members (e.g., wiring and piping). Thus, in order to downsize the robotic arm, the size of the cylindrical housing is required to be reduced.

Generally, the internal space of the cylindrical housing is provided at its tip end with a structure for attaching an end effector. The attaching structure includes insertion holes formed corresponding to the plurality of the elongated members so that the respective elongated members are inserted therein, and fixing members which fix the plurality of elongated members to the insertion holes, respectively.

The downsized robotic arm has the cylindrical housing and the internal space which are formed to be smaller. However, since the diameter of the fixing member of the attaching structure is difficult to be reduced, downsizing a substantial structure of the attaching structure is difficult. Therefore, the plurality of elongated members acutely bend outwardly in the radial direction of the cylindrical housing from the internal space of the cylindrical housing to the respective insertion holes of the attaching structure. Such a bending may cause damage to the plurality of elongated members.

Therefore, one purpose of the present disclosure is to provide a robotic arm and a robot having the robotic arm, capable of reducing their sizes while suppressing damage to a plurality of elongated members inserted therein.

SUMMARY OF THE DISCLOSURE

In order to solve the problem, according to one aspect of the present disclosure, a robotic arm to which an end effector is attached, includes a plurality of elongated members extending to the end effector, a cylindrical housing defining a periphery of an internal space configured to be a passage of the plurality of elongated members, and an attaching structure provided to a tip end of the internal space of the cylindrical housing so as to attach the end effector to a tip-end part of the cylindrical housing. The attaching structure includes insertion holes formed corresponding to the plurality of elongated members so as to insert the plurality of elongated members therein, and fixing members configured to fix the plurality of elongated members to the insertion holes, respectively. The cylindrical housing is formed so that the inner diameter is larger at the tip-end part than at a base-end part.

According to this structure, since the inner diameter is larger at its tip-end part than at its base-end part, the plurality of elongated members do not acutely bend outwardly in the radial direction of the cylindrical housing from the internal space of the cylindrical housing to the respective insertion holes of the attaching structure. Moreover, since the inner diameter is smaller at locations other than the tip-end part, the robotic arm can be reduced in size. As a result, the robotic arm according to the present disclosure can be downsized while suppressing the damage to the plurality of elongated members inserted therein.

For example, each of the plurality of elongated members is one of wiring and piping.

The cylindrical housing may include, between the tip-end part and the base-end part, an inner-diameter enlarged part in which the inner diameter increases toward the tip-end part.

According to this structure, the plurality of elongated members can gently bend inside the cylindrical housing. Therefore, the damage to the plurality of elongated members can be further suppressed.

The cylindrical housing may be provided with a plurality of joint shafts. The inner-diameter enlarged part may be located between the joint shaft provided closest to a tip end of the cylindrical housing and the adjacent joint shaft on a base-end side among the plurality of joint shafts in an axial direction of the cylindrical housing.

According to this structure, the robotic arm can be downsized as much as possible while suppressing the damage to the plurality of elongated members.

In order to solve the problem, according to one aspect of the present disclosure, a robot includes the robotic arm of any one of those described above, and the end effector attached to the robotic arm.

According to this structure, since the inner diameter of the robotic arm is larger at its tip-end part than at its base-end part, the plurality of elongated members do not acutely bend outwardly in the radial direction of the cylindrical housing from the internal space of the cylindrical housing to the respective insertion holes of the attaching structure. Moreover, since the inner diameter is smaller at locations other than the tip-end part, the robotic arm can be reduced in size. As a result, the robot according to the present disclosure can be downsized while suppressing the damage to the plurality of elongated members inserted therein.

The robot may be a painting robot configured to perform a painting work.

The end effector may be a paint gun.

The paint gun may be a bell-type paint gun.

Effect of the Disclosure

The present disclosure can provide the robotic arm and the robot having the robotic arm, capable of reducing their sizes while suppressing damage to the plurality of elongated members inserted therein.

MODE FOR CARRYING OUT THE DISCLOSURE

Figure 1:
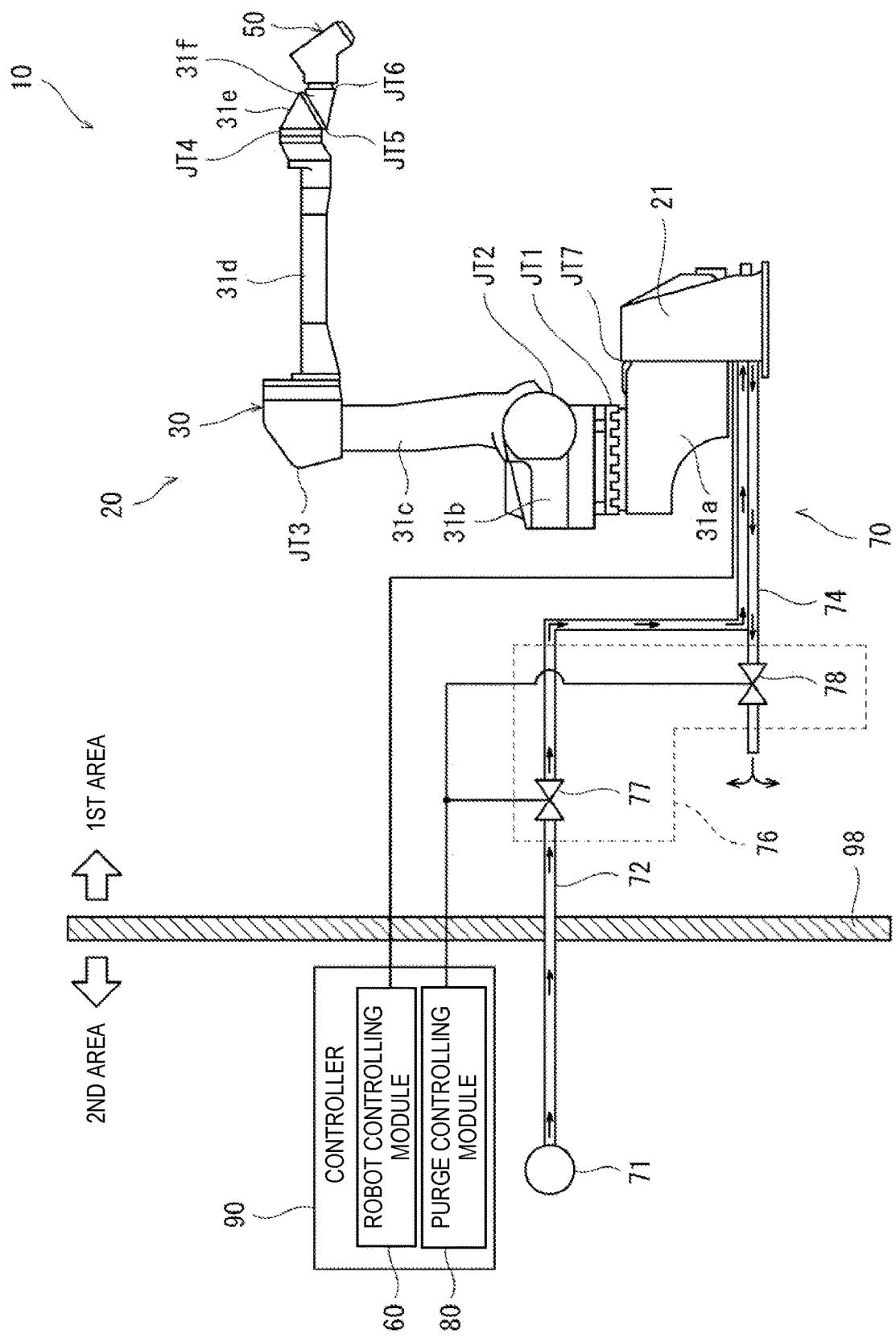
FIG. 1 is a schematic view illustrating the entire configuration of a robot system including a robotic arm according to one embodiment of the present disclosure.

Hereinafter, one embodiment of the present disclosure is described with reference to the accompanying drawings. Note that the same reference characters are given to the same or corresponding components throughout the drawings to omit redundant description.

(Robot System 10)

FIG. 1 is a schematic view illustrating the entire configuration of a robot system including a robotic arm according to this embodiment. As illustrated in FIG. 1, a robot system 10 includes a robot 20 which performs a painting work in a first area where explosive atmosphere exists, a purging device 70 which supplies protective gas into a container defining a periphery of a pressurized explosion-proof structure included in the robot 20 so as to purge the container, and a controller 90 which controls the robot 20 and the purging device 70.

The robot system 10 also includes a partition 98 which divides the first area where the explosive atmosphere exists from a second area where it does not exist. A flow rate adjusting device 76, a pedestal 21, a robotic arm 30, and an end effector 50 (described later) are placed in the first area. Moreover, a protective gas supplying source 71 (described later) and the controller 90 are placed in the second area.

The robot 20 according to this embodiment is a painting robot which performs painting to an automobile, etc. Therefore, the first area is a painting place in this embodiment. Atmosphere in the painting place is mixed with vaporized gas of organic solvents contained in paint, and often becomes flammable gas (or explosive gas). If electrical equipment is used in such a first area without any measure, an explosion may occur due to a spark induced by supplying power.

The robot 20 is provided with a plurality of electrical equipment such as servomotors (not illustrated) inside the container defining a part of the periphery of the robot 20. Therefore, before the robot 20 is energized, flammable gas which entered into the container is required to be discharged. Thus, purging is performed by supplying the protective gas into the container using the purging device 70.

Note that the pedestal 21 and a part of the robotic arm 30 constitute the container. In detail, an internal space of the pedestal 21 and an internal space of the robotic arm 30 communicate with each other, and the internal space of the robotic arm 30 extends from a base-end part to a third joint shaft JT3 of the robotic arm 30.

(Robot 20)

The robot 20 includes the pedestal 21, the robotic arm 30 coupled to the pedestal 21, the end effector 50 attached to a tip-end part of the robotic arm 30, and a robot controlling module 60 which controls the robotic arm 30 and the end effector 50 to perform the painting work.

(Robotic Arm 30)

The robotic arm 30 includes seven joint shafts JT1-JT7, and six links 31a-31f serially coupled therebetween via these joint shafts. The joint shafts JT1-JT7 of the robotic arm 30 are provided to be rotatable by the servomotors, respectively.

The first joint shaft JT1 couples a tip-end part of the first link 31a and a base-end part of the second link 31b so as to be rotatable by the servomotor about a vertical axis. The second joint shaft JT2 couples a tip-end part of the second link 31b and a base-end part of the third link 31c so as to be rotatable by the servomotor about a horizontal axis in a plane where a front-and-rear direction and an up-and-down direction of the robot 20 intersect.

The third joint shaft JT3 couples a tip-end part of the third link 31c and a base-end part of the fourth link 31d so as to be rotatable by the servomotor about a horizontal axis in a plane where the front-and-rear direction and the up-and-down direction of the robot 20 intersect. The fourth joint shaft JT4 couples a tip-end part of the fourth link 31d and a base-end part of the fifth link 31e so as to be rotatable in a twisted manner by the servomotor.

The fifth joint shaft JT5 couples a tip-end part of the fifth link 31e and a base-end part of the sixth link 31f so as to be rotatable in the twisted manner by the servomotor. The sixth joint shaft JT6 couples a tip-end part of the sixth link 31f and a base-end part of the end effector 50 so as to be rotatable in the twisted manner by the servomotor. The seventh joint shaft JT7 couples the pedestal 21 and a base-end part of the first link 31a so as to be rotatable by the servomotor about a horizontal axis in a plane where a left-and-right direction and the up-and-down direction of the robot 20 intersect.

The servomotors which rotate the first to third joint shafts JT1-JT3 and the seventh joint shaft JT7 are provided connectedly to the respective joint shafts to be rotated. On the other hand, the servomotors which rotate the fourth to sixth joint shafts JT4-JT6 are provided separately from the respective joint shafts to be rotated. In detail, these servomotors are provided adjacently to each other near the third joint shaft JT3, and rotate the joint shafts separated therefrom via a wiring, respectively. The servomotors which rotate the first to seventh joint shafts JT1-JT7 are provided inside the container.

(End Effector 50)

In this embodiment, the end effector 50 is a paint gun which sprays paint supplied from a paint supplying hose (piping) included in a plurality of elongated members 32 (described later), to a vehicle body of an automobile, etc. Note that in this embodiment the paint gun is a bell-type paint gun.

(Robot Controlling Module 60)

The robot controlling module 60 is provided inside the controller 90 together with a purge controlling module 80. Although a detailed configuration of the robot controlling module 60 is not particularly limited, for example, it is implemented by a known processor (e.g., a CPU) operating in accordance with a program stored in a memory.

(Purging Device 70)

The purging device 70 includes the protective gas supplying source 71, a supplying passage 72 (passage) which introduces the protective gas from the protective gas supplying source 71 into the container, the flow rate adjusting device 76 which adjusts a flow rate of the protective gas supplied from the protective gas supplying source 71 into the container, and the purge controlling module 80 which controls the flow rate adjusting device 76 to purge the container.

(Protective Gas Supplying Source 71)

The protective gas supplying source 71 is provided in the second area. In this embodiment, purging may be performed by using air as the protective gas.

(Supplying Passage 72)

As illustrated in FIG. 1, the supplying passage 72 extends from the protective gas supplying source 71 in the second area into the container of the robot 20 provided in the first area. In detail, the supplying passage 72 is inserted into the container through a through-hole formed in the pedestal 21 of the robot 20 so as to extend to the most distal part inside the container (i.e., to the third joint shaft JT3), and the protective gas is supplied from a tip-end part of the supplying passage 72.

Note that the supplying passage 72 also has a branch passage extending to near the servomotor which rotates the second joint shaft JT2, and supplies the protective gas from a tip-end part of the branch passage. Moreover, the supplying passage 72 has a branch passage extending to near the servomotor which rotates the seventh joint shaft JT7, and supplies the protective gas from a tip-end part of the branch passage.

(Discharging Passage 74)

The protective gas supplied into the container is discharged from the container through a discharging passage 74. The discharging passage 74 extends outside the container through a through-hole formed in the pedestal 21. Since the pressure inside the container is higher than the atmospheric pressure, the protective gas supplied into the container through the supplying passage 72 is discharged outside the container while being sucked by a tip-end part of the discharging passage 74.

(Flow Rate Adjusting Device 76 and Purge Controlling Module 80)

The flow rate adjusting device 76 includes a first control valve 77 provided to the supplying passage 72, and a second control valve 78 provided to the discharging passage 74. Moreover, the purge controlling module 80 is provided inside the controller 90 together with the robot controlling module 60. Although a detailed configuration of the purge controlling module 80 is not particularly limited, similarly to the robot controlling module 60, it may be implemented by a known processor (e.g., a CPU) operating in accordance with a program stored in a memory.

(Substantial Configuration of Robotic Arm 30)

Figure 2:
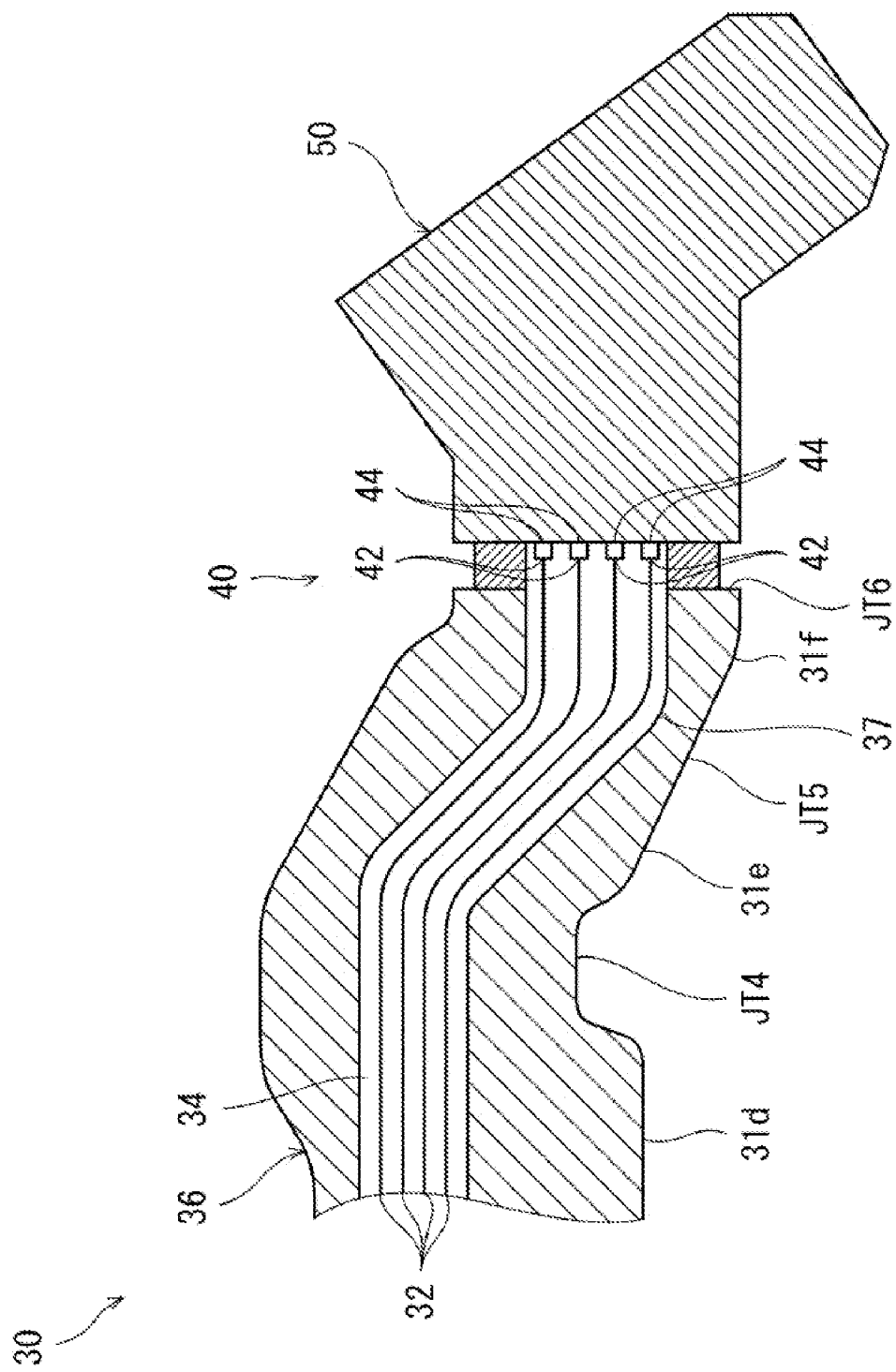
FIG. 2 is a partial cross-sectional view schematically illustrating a substantial configuration of the robotic arm according to one embodiment of the present disclosure.

A substantial configuration of the robotic arm 30 according to this embodiment is described. FIG. 2 is a partial cross-sectional view schematically illustrating the substantial configuration of the robotic arm according to this embodiment. As illustrated in FIG. 2, the robotic arm 30 according to this embodiment includes the plurality of elongated members 32 extending to the end effector 50, and a cylindrical housing 36 defining a periphery of an internal space 34 which is a passage for the plurality of the elongated members 32. Moreover, the robotic arm 30 also includes an attaching structure 40 provided to a tip end of the internal space 34 of the cylindrical housing 36, which attaches the end effector 50 to the tip-end part of the cylindrical housing 36. Note that, in this embodiment, a plurality of fixing members 42 (described later) are disposed inside the internal space 34 in addition to the elongated members 32.

(Plurality of Elongated Members 32)

Each of the plurality of elongated members 32 is wiring or piping. In this embodiment, the plurality of elongated members 32 include electrical wiring (wiring) and the paint supplying hose (piping) connected to the end effector 50. Note that each of the plurality of elongated members 32 may be formed to have the diameter smaller than that of a similar member provided to a robotic arm which is not reduced in size. Accordingly, the robotic arm can easily be downsized.

(Cylindrical Housing 36)

In this embodiment, the cylindrical housing 36 is constituted from the fourth joint shaft JT4 to the tip end of the robotic arm 30. Note that the plurality of elongated members 32 may be disposed so as to be exposed along an outer surface of the robotic arm 30 on the base-end side of the fourth joint shaft JT4. Therefore, maintainability of the plurality of elongated members 32 can be improved.

The cylindrical housing 36 is formed so that its inner diameter is larger at the tip-end part thereof than at the base-end part. In this embodiment, the cylindrical housing 36 has an inner-diameter enlarged part 37 in which the inner diameter increases toward a tip-end part thereof, between the sixth joint shaft JT6 (the joint shaft provided closest to the tip end of the cylindrical housing 36 among the plurality of joint shafts) and the fifth joint shaft JT5 (the joint shaft adjacent to the sixth joint shaft JT6 on the base-end side) in the axial direction.

Note that the inner diameter of the cylindrical housing 36 at its base-end part in the axial direction (i.e., the part on the base-end side of the inner-diameter enlarged part 37) may be constant. This diameter may be about 50 cm. Moreover, the inner diameter of the cylindrical housing 36 at its tip-end part in the axial direction (i.e., the part on the tip-end side of the inner-diameter enlarged part 37) may be constant. This diameter may be about 70 cm.

(Attaching Structure 40)

The attaching structure 40 includes insertion holes 44 formed corresponding to the plurality of elongated members 32 so that the respective elongated members 32 are inserted therein, and the fixing members 42 which fix the plurality of elongated members 32 to the insertion holes 44, respectively. The fixing members 42 may be, for example, hexagon nuts attached so as to surround the plurality of elongated members 32, respectively, from the end effector 50 side. That is, when seen in the axial direction of the cylindrical housing 36, the diameter of the fixing member 42 is larger than the diameter of each of the plurality of elongated member 32.

(Effect)

Figure 3:
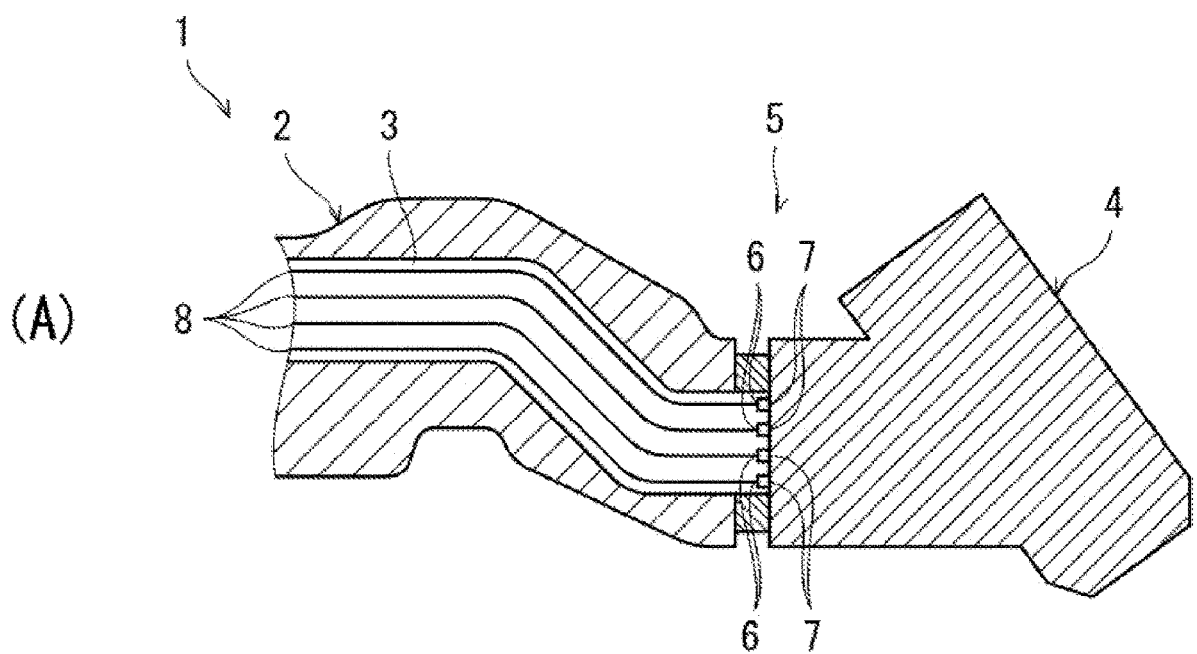
FIGS. 3(A) and 3(B) are partial cross-sectional views each schematically illustrating a part of the robotic arm and an end effector attached to a tip-end part of the robotic arm, which are referred in order to describe a possible problem when downsizing the robotic arm.
Figure 3:
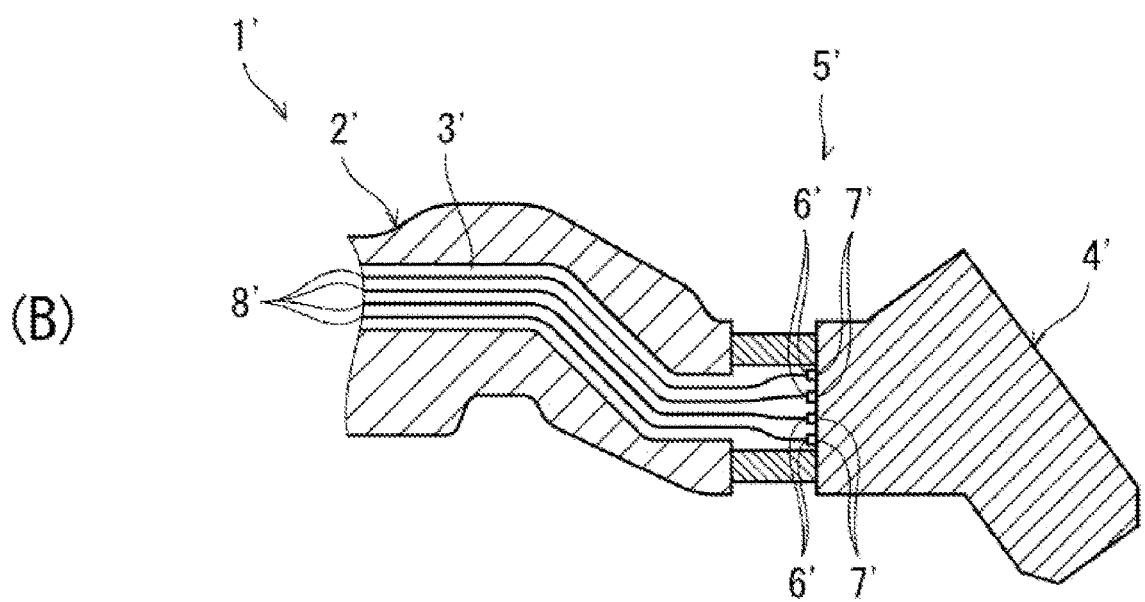

With the configuration described above, the robotic arm 30 according to this embodiment can be reduced in size while suppressing damage to the plurality of elongated members 32 inserted into the robotic arm 30. This effect is described in detail with reference to FIGS. 3(A) and 3(B). FIGS. 3(A) and 3(B) are schematic views each illustrating a part of the robotic arm and the end effector attached to the tip-end part of the robotic arm, which are referred in order to describe the possible problem when downsizing the robotic arm. FIG. 3(A) is a schematic view illustrating a robotic arm and an end effector attached thereto according to Conventional Mode 1, and FIG. 3(B) is a schematic view illustrating a robotic arm and an end effector attached thereto according to Conventional Mode 2.

As illustrated in FIG. 3(A), a robotic arm 1 according to Conventional Mode 1 is provided at its tip-end part with an attaching structure 5 for attaching an end effector 4. The attaching structure 5 includes a plurality of insertion holes 7 formed corresponding to a plurality of elongated members 8 so that the respective elongated members 8 are inserted therein, and fixing members 6 which fix the plurality of elongated members 8 to the insertion holes 7, respectively.

As illustrated in FIG. 3(B), in a robotic arm 1' according to Conventional Mode 2, a cylindrical housing 2' and its internal space 3 are formed to be smaller. However, since the diameter of each fixing member 6' of an attaching structure 5' is difficult to be reduced, downsizing of the substantial structure is difficult. Meanwhile, if the attaching structure 5 of Conventional Mode 1 described above is applied as it is, a plurality of elongated members 8' may acutely bend outwardly in the radial direction of the cylindrical housing 2' from the internal space of the cylindrical housing 2' to corresponding insertion holes 7' of the attaching structure 5'. Such a bending may cause damage to the plurality of elongated members 8'.

In this respect, as illustrated in FIG. 3(B), it may be considered to suppress the damage to the plurality of elongated members 8' by providing a spacer between the cylindrical housing 2' and the attaching structure 5' so that each of the plurality of elongated members 8' gently bends inside the spacer so as to reach the attaching structure 5'. However, providing such a spacer contradicts the purpose to reduce the size of the robotic arm 1'. Moreover, the spacer may impede the robotic arm 1' taking a desired posture.

On the other hand, the robotic arm 30 according to this embodiment is formed so that the inner diameter is larger at its tip-end part than at its base-end part. Therefore, the plurality of elongated members 32 do not acutely bend outwardly in the radial direction of the cylindrical housing 36 from the internal space 34 of the cylindrical housing 36 to the respective insertion holes 44 of the attaching structure 40. Moreover, since the inner diameter is smaller at locations other than the tip-end part of the robotic arm 30, the robotic arm 30 can be reduced in size. As a result, the robotic arm 30 according to the present disclosure can be downsized while suppressing the damage to the plurality of elongated members 32 inserted therein.

Moreover, in this embodiment, since the cylindrical housing 36 has, between its tip-end part and base-end part, the inner-diameter enlarged part 37 in which the inner diameter increases toward the tip-end part, the plurality of elongated members 32 can gently bend inside the cylindrical housing 36. Therefore, the damage to the plurality of elongated members 32 can be further suppressed.

Moreover, in this embodiment, since the cylindrical housing 36 has the inner-diameter enlarged part 37 between the sixth joint shaft JT6 and the fifth joint shaft JT5 in the axial direction of the cylindrical housing 36, it can be downsized as much as possible while suppressing the damage to the plurality of elongated members 32.

Then, since the robotic arm 30 according to this embodiment can achieve the effects described above, the robot 20 also can be downsized while suppressing the damage to the plurality of elongated members 32 inserted therein.

(Modifications)

It is apparent for a person skilled in the art from the above description that many improvements and other embodiments of the present disclosure are possible. Therefore, the above description is to be interpreted only as illustration, and it is provided in order to teach a person skilled in the art the best mode to implement the present disclosure. The details of the structures and/or the functions may be substantially changed, without departing from the spirit of the present disclosure.

Although in the above embodiment the robot 20 is the painting robot, it is not limited to this. For example, the robot 20 may be a transfer robot for transferring a workpiece, or may be another robot.

Although in the above embodiment the end effector 50 is the bell-type paint gun, it is not limited to this. For example, the end effector 50 may be a simple spray-type paint gun, or may be another type of paint gun. If the robot 20 is a robot other than the painting robot, the end effector 50 may be an end effector other than the paint gun (e.g., an end effector with a holding part which holds a workpiece).

Although in the above embodiment the plurality of elongated members 32 include the electrical wiring (wiring) and the paint supplying hose (piping) connected to the end effector 50, it is not limited to this. For example, all of the plurality of elongated members 32 may be the electrical wiring, or all of them may be the paint supplying hoses. In one of these cases, for example, elongated members which are not inserted into the internal space 34 of the cylindrical housing 36 may be exposed outside the cylindrical housing 36 to extend to the end effector 50. Moreover, for example, if the robot 20 is a robot other than the painting robot, the plurality of elongated members 32 may include piping other than the paint supplying hose.

Although in the above embodiment the inner-diameter enlarged part 37 is provided between the sixth joint shaft JT6 and the fifth joint shaft JT5 in the axial direction of the cylindrical housing 36, it is not limited to this, and it may be provided at another position. Note that the cylindrical housing 36 may be formed so that the diameter increases from the base end toward the tip end thereof, over the entire range of the cylindrical housing 36 between the base end and the tip end in its axial direction. In other words, the entire cylindrical housing 36 may be configured as the inner-diameter enlarged part 37.

Moreover, as illustrated in the drawings, although the inner-diameter enlarged part 37 according to this embodiment has a linear inner surface when seen from side in the cross-sectional view, the inner surface may have a step-like shape, or another shape. Note that the inner-diameter enlarged part 37 may be formed to have one or more recess in its inner surface so that its diameter intermittently increases toward the tip-end part of the cylindrical housing 36.

Moreover, the inner-diameter enlarged part 37 is not limited to have the diameter which increases toward the tip-end part of the cylindrical housing 36, but may have the diameter which becomes larger at one location in the axial direction of the cylindrical housing 36.

DESCRIPTION OF REFERENCE CHARACTERS

1 Robotic Arm
2 Cylindrical Housing
3 Internal Space
4 End Effector
5 Attaching Structure
6 Fixing Member
7 Insertion Hole
8 Plurality of Elongated Members
10 Robot System
20 Robot
21 Pedestal
30 Robotic Arm 31 Link
32 Plurality of Elongated Members
34 Internal Space
36 Cylindrical Housing
37 Inner-Diameter Enlarged Part
40 Attaching Structure
42 Fixing Member
44 Insertion Hole
50 End Effector
60 Robot Controlling Module
70 Purging Device
71 Protective Gas Supplying Source
72 Supplying Passage
74 Discharging Passage
76 Flow Rate Adjusting Device
77 First Control Valve
78 Second Control Valve
80 Purge Controlling Module
90 Controller
98 Partition

What is claimed is:

1. A robotic arm to which an end effector is attached, comprising:
   a plurality of elongated members extending to the end effector;
   a cylindrical housing defining a periphery of an internal space configured to be a passage of the plurality of elongated members; and
   an attaching structure provided to a tip end of the internal space of the cylindrical housing so as to attach the end effector to a tip-end part of the cylindrical housing, the attaching structure including:
   insertion holes formed corresponding to the plurality of elongated members so as to insert the plurality of elongated members therein; and
   fixing members configured to fix the plurality of elongated members to the insertion holes, respectively, wherein
   the cylindrical housing is formed so that the inner diameter is larger at the tip-end part than at a base-end part,
   the cylindrical housing includes, between the tip-end part and the base-end part, an inner-diameter enlarged part in which the inner diameter increases toward the tip-end part,
   the cylindrical housing is provided with a plurality of joint shafts, and
   the inner-diameter enlarged part is located between the joint shaft provided closest to a tip end of the cylindrical housing and the adjacent joint shaft on a base-end side among the plurality of joint shafts in an axial direction of the cylindrical housing.

2. The robotic arm of claim 1, wherein each of the plurality of elongated members is one of wiring and piping.

3. A robot, comprising:
   the robotic arm of claim 1; and
   an end effector attached to the robotic arm.

4. The robot of claim 3, wherein the robot is a painting robot configured to perform a painting work.

5. The robot of claim 4, wherein the end effector is a paint gun.

6. The robot of claim 5, wherein the paint gun is a bell-type paint gun.

* * * * *